May 28, 1968     E. KOCK     3,385,522
CLEANING DEVICE FOR LIQUID PRESSURE REGULATING APPARATUS
Filed May 20, 1966
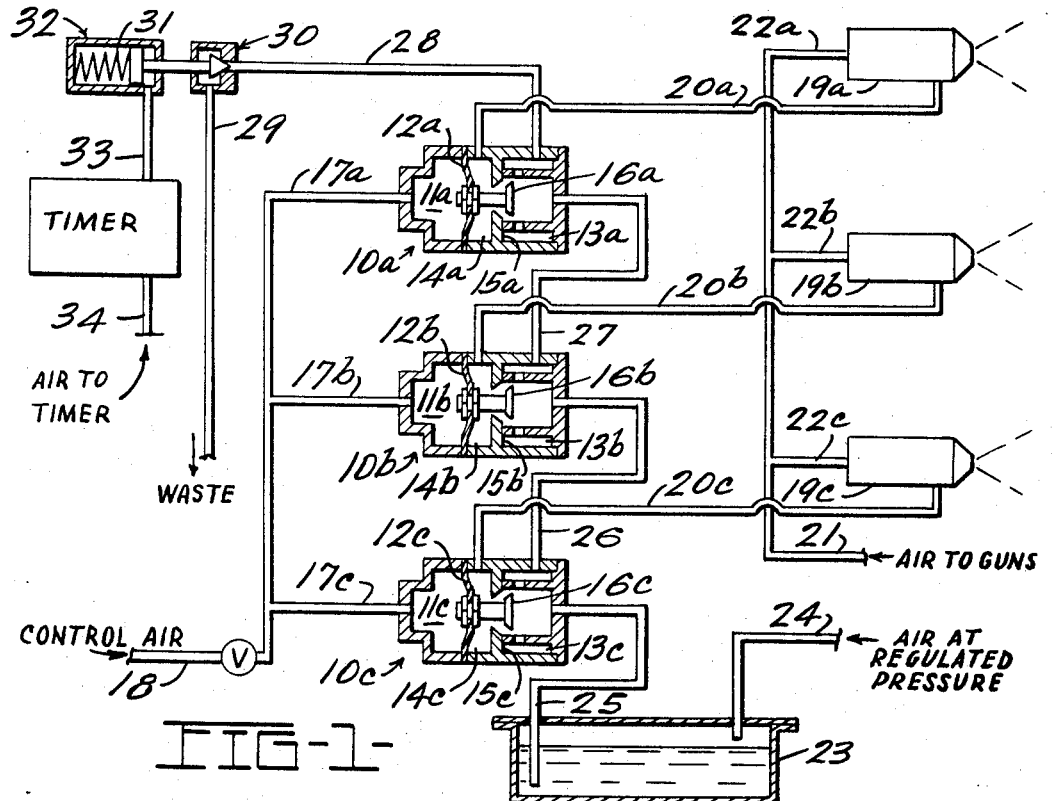
FIG-1-
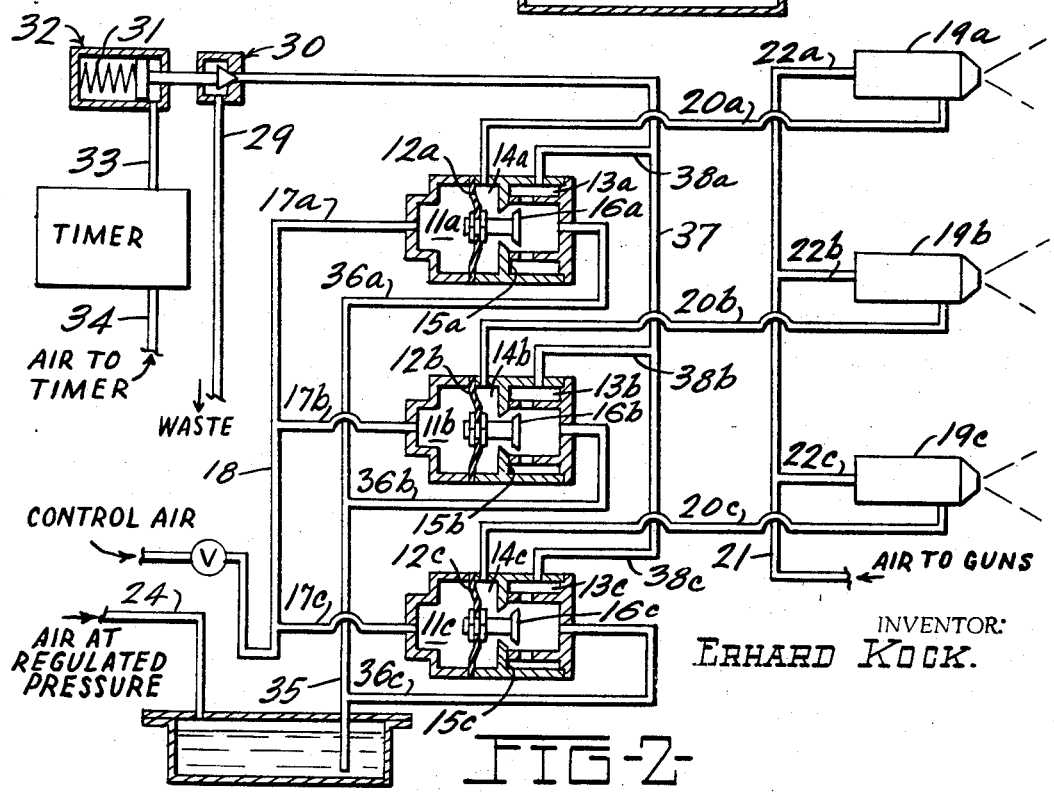
FIG-2-
INVENTOR:
ERHARD KOCK.

3,385,522
CLEANING DEVICE FOR LIQUID PRESSURE REGULATING APPARATUS

Erhard Kock, Toledo, Ohio, assignor to The De Vilbiss Company, Toledo, Ohio, a corporation of Ohio
Filed May 20, 1966, Ser. No. 551,597
9 Claims. (Cl. 239—104)

This invention relates to an apparatus for maintaining constant liquid pressure in a liquid coating device, such as a paint spraying installation. More particularly, this invention relates to a pressure regulation system which may be used with a liquid coating installation having a plurality of individual liquid spray guns, which pressure regulation device is particularly adapted for use with high solids content material sprayed at low pressure and which may be cleaned or purged of accumulated or separated solids automatically by periodically exposing the internal parts of the pressure regulators to liquid at a relatively high flow rate.

Air controlled, liquid pressure regulating valves are frequently used in liquid coating systems to assure a uniform supply of liquid at a constant pressure to the spray guns or coating nozzles. Because of variations inherent in the pressure system supplying the liquid to a gun, it is preferable to pressurize the source of liquid at a relatively high pressure and to reduce this to the pressure to be used at the gun by means of air controlled pressure regulator valves. Because the air controlled valves can effectively maintain a steady low pressure on the liquid fed to the gun and smooth-out variations in liquid supply pressure, and further because the air controlled pressure regulator valves, through use of a predetermined air pressure, may be used to set the pressure of the liquid fed to the gun, they have certain advantages over installations in which the initial pressure on the liquid or paint is maintained at the value at which it is delivered to the spray gun.

One difficulty in using air controlled pressure regulation valves is particularly prevalent when applying vitreous enamel type paints or coating materials, which contain a relatively large percentage of abrasive suspended solids. In the past these enamels have been sprayed at fairly high flow rates requiring relatively high fluid pressures but it is advantageous from the standpoint of increased deposition efficiency to spray at relatively low flow rates and thus relatively low pressures, less than 20 p.s.i. The flow rate of the liquid gives rise to the difficulty that, due to the construction of the internal valve within the pressure regulator, the slow flow of liquid material through the internal valve and valve seat at low pressure permits the accumulation of deposits or sludges on the edges of the valve and valve seat and thus eventually reduces the rate at which material is supplied to the spray guns or may completely clog the regulator valve.

It has been determined that a surge of liquid at relatively high flow rate through the pressure regulator valve at predetermined intervals will remove these sludges or deposits from the faces of the valve members, and eliminate the usual variations in flow rates that otherwise occur after prolonged operation. A periodic surge in liquid pressure might adversely affect the characteristics of the spray pattern if this pressure surge is permitted to pass through the spray guns themselves.

Accordingly, the instant invention comprises an apparatus for controlling the liquid pressure supplied to a spray gun which includes a pressure regulator between a pressurized source of liquid and the spray gun and means to provide a periodic surge at relatively high pressure of the spraying liquid itself to remove sludge or deposits from the interior surfaces of the pressure regulator and which vents or dumps these deposits through a relief passage which is remote from and does not significantly affect the operation of the spray gun itself.

Accordingly, it is an object of this invention to provide an apparatus for regulating the pressure of liquid coating material supplied to a liquid spray device, which apparatus may be periodically cleaned or purged by high pressure surges of the liquid which is then vented or dumped through a relief passage connected to each of the pressure regulator valves of the spraying system.

It is another object of this invention to provide a pressure regulation system as described which includes a device for periodically purging or cleaning the pressure regulator interiors through the timed control of one or more valve mechanisms which open and close one or more relief passages.

Other objects and advantages of this invention will be apparent from the following detailed description thereof, reference being made to the accompanying drawings in which:

FIG. 1 is a schematic view of a pressure regulation system of this invention, showing it associated with a liquid coating apparatus including three separate liquid spray guns, each gun having its own pneumatically controlled pressure regulator and each pressure regulator having a common purging or cleaning system controlled by a single pneumatically controlled, normally closed dump valve; and FIG. 2 is a schematic diagram similar to FIG. 1, but showing an alternate connection between the individual pressure regulators and the common purging or cleaning system.

Referring to FIG. 1, the pneumatically controlled pressure regulator valves, generally designated by reference numerals $10a$, $10b$, $10c$, each consist of a pressure-tight enclosure separated into an upper chamber and a lower chamber $11a$–$11c$ by a movable diaphragm $12a$–$12c$. The upper chamber is divided into an inlet portion $13a$–$13c$ and an outlet portion $14a$–$14c$ by a wall having a valve seat $15a$–$15c$ to cooperate with a movable valve $16a$–$16c$ which is connected to and moved in response to its associated diaphragm $12a$–$12c$. The lower chamber $11a$–$11b$ of each of the regulators $10a$–$10c$ is connected to a source of regulated air pressure through air lines $17a$–$17c$ which connect to a common air header $18$. If desired, each of the regulators $10a$–$10c$ may have individual sources of control air. The outlet portion $14a$–$14c$ of the upper chamber of each of the regulator valves $10a$–$10c$ is connected to a corresponding liquid spray device $19a$–$19c$ by a line $20a$–$20c$. In this example, the liquid spray devices $19a$–$19c$ shown are spray guns of the air-atomizing type which are supplied with atomizing air pressure through a line $21$ and branch lines $22a$–$22c$.

An enclosed paint pot $23$ is pressurized in the usual manner by an air line $24$ and is connected to the inlet portion $13c$ of the pressure regulator $10c$ by a liquid supply line $25$. The pressure supplied to the paint pot $23$ is in excess of the pressure desired at the guns $19a$–$19c$ for normal spraying. A line $26$ connects the inlet portion $13c$ of the regulator $10c$ to the inlet portion $13b$ of the regulator $10b$ and a line $27$ connects the inlet portion $13b$ of the regulator $10b$ with the inlet portion $13a$ of the regulator $10a$. A relief passage $28$ extends from the inlet portion $13a$ of the regulator $10a$ and is connected to a dump or waste line $29$ through a normally closed, pneumatically opened dump or relief valve $30$.

As schematically shown in FIG. 1, the relief valve $30$ is held in normally closed position by a spring $31$ within an air pressure cylinder $32$ and is opened when the force exerted against the spring $31$ by air pressure in a line $33$ exceeds the force of the spring holding the valve 30 closed. A timer which controls the pressure in the line 33 is schematically shown. This timer, which opens and closes a valve between the line 33 and an air pressure supply line 34, may be of any commercially available type but is preferably of the type which can be adjusted to open for a preset time at periodic intervals.

The operation of the system illustrated in FIG. 1 is as follows: With the valve 30 in normally closed position, as shown, and with liquid pressure of, for instance, 20 p.s.i., supplied to the paint pot 23, liquid or paint at this pressure is supplied to the inlet portions 13a–13c of each of the fluid regulators 10a–10c. Depending upon the liquid pressure desired at the spray guns 19a–19c, a regulated air pressure supplied in the lines 17a–17c, causes the diaphragms 12a–12c to adjust the position of the valves 16a–16c relative to the valve seats 15a–15c in each of the pressure regulators 10a–10c so that the output pressure from the output section 14a–14c of the upper chamber to the lines 20a–20c will be at the desired value. In practice, with the gun fluid pressure desired in the range of 4 to 15 p.s.i., it has been determined that a very small clearance, such as about 0.003 inch, between the adjacent surfaces of the valves 16a–16c and their associated valve seats 15a–15c is necessary. This very close clearance of the valve causes a tendency for the suspended solids to separate out of a porcelain enamel and to clog or deposit as sludge upon the adjacent surfaces. This, of course, is detrimental in that it interferes with the normal operation of the pressure regulator and causes the output pressure in the lines 20a–20c to change over an unpredictable range at unpredictable intervals.

When the normally closed valve 30 is opened by air pressure in the line 33, as controlled by the timer, the inlet portion 13a of the regulator 10a is vented through the lines 28 and 29. Likewise, the inlet portions 13b and 13c of the regulators 10b and 10c are likewise vented through their connecting lines 26 and 27 which, in effect, connect in series the three inlet portions 13a–13c of the valves 10a–10c. With the normally closed valve 30 open, the liquid from the paint pot 23 flows rapidly and directly through the inlet portions 13a–13c of each of the regulators 10a–10c and through the waste or vent line 29 at the full pot pressure established by the line 24. This rapid flow of material purges the valves 16a–16c and their associated seat 15a–15c in each of the regulators 10a–10c of the deposits which have been built up thereon. At the same time, the pressure in the fluid regulator valves and thus the fluid flow to the guns 19a–19c through lines 20a–20c remains relatively constant although there may be a very small and temporary reduction when the dump valve 30 is first opened. When the dump valve 30 returns to its closed position, the regulators resume their normal function.

Using a conventional porcelain enamel coating material supplied from the paint pot 23 at approximately 20 p.s.i. it has been found that the interiors of the pressure regulators may be sufficiently purged in a one second period for each ten seconds of normal operation. Commercially available timers for control of the air pressure in the line 33, which controls the opening of the normally closed valve 30, are calibrated such that the on-time or purging cycle may be set as a percent of a predetermined normal cycle. Thus, when set at ten percent, the purge time would be one second for every ten seconds of normal operation or one-half second for every five seconds of normal operation, etc. The optimum time intervals between purges and length of the purge will, of course, vary with the type of liquid coating material being used and the setting of the regulator valves, etc.

The system schematically shown in FIG. 2 is similar to that of FIG. 1 with the exception that the inlet portons 13a–13c of each of the regulators 10a–10c are each separately supplied from a common liquid supply line 35 by separate branch lines 36a–36c. A common relief header 37 is connected to each of the inlet portions 13a–13c of the regulators 10a–10c by relief passage branches 38a–38c. In all other aspects, the system of FIG. 2 is similar to that of FIG. 1 and the same reference numerals have been used for similar components. The system of FIG. 2 has, in effect, a parallel connection for the inlet portions 13a–13c of the regulators 10a–10c with the liquid supply line 35 and the relief header 37, as opposed to the series connection of FIG. 1. In certain instances, particularly where a relatively large number of spray guns and regulators are used, the parallel connection may be preferable, because a shorter purge time may be required to clear the clogged particles from the regulators into the relief header 37, because each of the inlet portions of each regulator connects directly to the relief header 37, rather than flowing through the next adjacent regulator.

In the case of relatively high fluid flow rates, as many as one relief valve per spray gun may be required to maintain adequate pressures at the regulator input.

As previously stated, the pressure regulation system including the purge of cleaning system heretofore described may be used with any liquid coating installation, conventional or electrostatic. It may be advantageously used with any liquid medium but is particularly adapted to solve problems inherent in the use of porcelain type coating liquids which are desirably sprayed or applied at relatively low pressures and which contain a large percentage of suspended solids.

Various modifications of the above described embodiments may be made by persons skilled in the art without departing from the scope and tenor of the accompanying claims.

I claim:

1. An apparatus for controlling the liquid pressure applied to a spray gun comprising, in combination, a source of liquid under pressure in excess of that desired for normal spraying, a pressure regulator interposed between said source and the spray gun, said pressure regulator having a first liquid exit connected to said spray gun for discharge of liquid under regulated pressure and a second normally closed liquid exit separated by a pressure reducing valve from said first liquid exit, and means to open said normally closed second liquid exit to cause a relatively rapid flow of liquid from said source through said pressure regulator and directly out of said second liquid exit valve at said higher than said normal spraying pressure to purge said regulator of solids deposited during normal spraying.

2. The apparatus of claim 1 which includes relief means for by-passing liquid flow around said spray gun and directly through said regulator.

3. The apparatus of claim 1 wherein said means causing liquid flow through said regulator at higher than normal pressure is periodically activated in accordance with a programmed sequence providing that it be activated approximately ten percent of the total time of operation of the spray gun.

4. The apparatus of claim 2 wherein said relief means includes a relief passage and a normally closed, spring biased valve, pressure responsive means for overcoming said spring bias to open said valve, and means for periodically activating said pressure responsive means.

5. An apparatus for controlling the liquid pressure applied to a plurality of spray guns, comprising, in combination, a source of liquid under a pressure in excess of that desired for normal spraying, a plurality of pressure regulators interposed between said source and said guns with each regulator reducing the pressure of liquid supplied to one of said spray guns, each of said pressure regulators having a first liquid exit connected to its associated spray gun for discharge of liquid under regulated pressure and a second liquid exit separated by a pressure reducing valve from said first liquid exit, and means to open said normally closed second liquid exits to cause a flow of liquid from said source at higher than said normal spraying pressure through each of said regulators and directly out of said second exits to purge said regulators of solids deposited during normal spraying.

6. The apparatus of claim 5 wherein said last means is connected to cause a flow of liquid through said pressure regulators in series.

7. An apparatus for regulating liquid pressure in a supply line to a liquid spray device, said apparatus including a fluid regulator having an upper and a lower chamber separated by a pressure responsive diaphragm and a valve mechanism separating said upper chamber into an input portion and an output portion with the valve therebetween opened and closed by movement of said diaphragm, inlet means connecting said input portion to a source of liquid at relatively high pressure, outlet means connecting said output portion to said spray device, and means for supplying control air at a predetermined pressure to said lower chamber, whereby said valve is opened to release liquid from said outlet portion to said spray device at a predetermined regulated pressure, and a normally closed relief passage for venting said input portion, which when opened, causes a rapid flow of liquid from said source directly through said input portion whereby said valve is exposed to and purged by liquid flowing through said inlet portion from said inlet means to said relief passage.

8. A system for regulating the pressure of liquid supplied to a liquid coating installation including a plurality of liquid spray devices, said system including a fluid regulator for each of the liquid spray devices in said installation, each of said regulators having an upper and a lower chamber separated by a pressure responsive diaphragm, a valve mechanism separating said upper chamber into an input portion and an output portion with the valve therebetween opened and closed by movement of said diaphragm, means connecting the input portion of each of said regulators to a source of liquid at relatively high pressure, means connecting the output portion of each of said regulators to its corresponding liquid spray device, and means for supplying control air at a predetermined pressure to the lower chamber of each of said regulators, whereby said regulator valves are opened to release liquid from said outlet portions to said corresponding spray devices at a predetermined regulated pressure, and a normally closed relief passage connected to said input portion of each of said regulators, which, when opened, causes a rapid flow of liquid from said source against the valves in each of said regulators whereby each of said valves is exposed to and purged by liquid flowing through said input portions to said relief passage.

9. The system of claim 8 wherein said relief passages from each of said regulators are connected to a common relief header and which further includes a normally closed valve in said header which, when opened, permits liquid flow through each of said relief passages to said common relief header.

References Cited
UNITED STATES PATENTS

| | | | |
|---|---|---|---|
| 1,265,768 | 5/1918 | Fuller | 239—110 |
| 1,929,348 | 10/1933 | Cathcart | 239—110 |
| 2,022,481 | 11/1935 | Schellenger | 239—127 X |
| 2,600,554 | 6/1952 | Lyons | 239—124 |
| 3,061,198 | 10/1962 | Kerr et al. | 239—124 X |

M. HENSON WOOD, Jr., *Primary Examiner.*

VAN C. WILKS, *Assistant Examiner.*